(12) United States Patent
Damm

(10) Patent No.: US 7,118,127 B2
(45) Date of Patent: Oct. 10, 2006

(54) AIR-BAGS

(75) Inventor: Marcus Damm, Alingsås (SE)

(73) Assignee: Autoliv Development AB, Vårgårda (SE)

(*) Notice: Subject to any disclaimer, the term of this patent is extended or adjusted under 35 U.S.C. 154(b) by 91 days.

(21) Appl. No.: 10/821,470

(22) Filed: Apr. 9, 2004

(65) Prior Publication Data

US 2004/0256845 A1  Dec. 23, 2004

(30) Foreign Application Priority Data

Apr. 10, 2003  (GB) ................. 0308347.4

(51) Int. Cl.
*B60R 21/239* (2006.01)
(52) U.S. Cl. .............. 280/739; 280/743.1; 280/742
(58) Field of Classification Search ........... 280/739, 280/743.1, 742
See application file for complete search history.

(56) References Cited

U.S. PATENT DOCUMENTS

| | | | | | |
|---|---|---|---|---|---|
| 3,887,213 | A | * | 6/1975 | Goetz .................. | 280/738 |
| 4,097,065 | A | | 6/1978 | Okada et al. | |
| 4,805,930 | A | * | 2/1989 | Takada ................. | 280/739 |
| 5,280,953 | A | * | 1/1994 | Wolanin et al. ........ | 280/739 |
| 5,310,215 | A | * | 5/1994 | Wallner ................ | 280/739 |
| 5,454,595 | A | * | 10/1995 | Olson et al. .......... | 280/743.1 |
| 5,492,363 | A | * | 2/1996 | Hartmeyer et al. ..... | 280/739 |
| 5,496,063 | A | * | 3/1996 | Conlee et al. ........ | 280/739 |
| 5,839,755 | A | * | 11/1998 | Turnbull .............. | 280/739 |
| 6,017,057 | A | * | 1/2000 | O'Docherty ........... | 280/739 |
| 2003/0234528 | A1 | * | 12/2003 | Bohn et al. .......... | 280/743.1 |

FOREIGN PATENT DOCUMENTS

| | | | |
|---|---|---|---|
| FR | 2825054 | * | 5/2001 |
| GB | 2407071 | * | 4/2005 |
| JP | 1-277991 | | 4/1988 |
| JP | 06-305391 | * | 11/1994 |
| JP | 06-305392 | * | 11/1994 |
| JP | 07-329694 | * | 12/1995 |
| JP | 08-268213 | * | 10/1996 |
| JP | 10-076905 | * | 3/1998 |
| JP | 11-348713 | * | 12/1999 |
| JP | 2001-171456 | * | 6/2001 |
| JP | 2001-277991 | * | 10/2001 |
| JP | 2001-277992 | * | 10/2001 |
| JP | 2002-059803 | * | 2/2002 |
| JP | 2002-067849 | * | 3/2002 |
| WO | WO 96/34780 | | 11/1996 |
| WO | WO 03/013916 A1 | | 2/2003 |

* cited by examiner

*Primary Examiner*—David R. Dunn
*Assistant Examiner*—George D. Spisich
(74) *Attorney, Agent, or Firm*—Brinks Hofer Gilson & Lione

(57) ABSTRACT

An air-bag is disclosed which has a vent hole formed therein. The periphery of the vent hole has first and second opposed part, wherein a tuck is formed in the air-bag. The tuck is formed in the region of the first part of the vent hole periphery such that the second part of the vent hole periphery extends past the first part in a direction extending substantially outwards from the interior volume of the air-bag, when the air-bag is inflated.

10 Claims, 3 Drawing Sheets

AIR-BAGS

CROSS REFERENCE TO RELATED APPLICATION

This application claims priority to UK 0308347.4, filed Apr. 10, 2003, which is currently pending.

BACKGROUND AND SUMMARY OF THE INVENTION

The present invention relates to an air-bag, and more particularly relates to an air-bag having a vent hole formed therein.

It is known to be desirable to vent an air-bag provided for use as a safety arrangement in a motor vehicle to protect an occupant of the vehicle in the event that an accident should occur. It is known to be particularly important to vent an air-bag if the air-bag is of the type intended to provide protection in the event that a front impact should occur.

An air-bag that is intended to provide protection in the case that a front impact should occur is generally located so that, when inflated, the air-bag is positioned in front of the occupant of the vehicle to be protected. During the front impact, the motor vehicle will decelerate very suddenly. Due to inertia, the occupant of the vehicle tends to continue moving, and thus the occupant of the vehicle is, in effect, moving forwardly relative to the rest of the vehicle, and thus the occupant moves forwardly relative to the air-bag itself. The function of the air-bag is to decelerate the occupant, preferably in such a way that the occupant suffers no or only relatively slight injuries. The air-bag must be inflated very swiftly in the event of an accident and thus, typically, contains relatively high-pressure gas when inflated. If the air-bag were not vented, then because of the high pressure of gas within it, the air-bag would not decelerate the occupant gently, but instead would stop the occupant extremely swiftly and hence may injure the occupant. It is thus known to provide air-bags with one or more vent holes formed in them so that, when the air-bag is struck by the occupant in a crash situation, gas can escape from the air-bag through the vent hole or holes, so that the air-bag serves the function of decelerating the occupant more gently, to avoid serious injury.

It has been found to be advantageous to configure the or each vent hole of an air-bag so that the venting flow of gas passing through the vent hole as an occupant strikes the air-bag can be directed along a predefined flow path. It is particularly advantageous to be able to direct the flow of venting gas from the interior of the air-bag, away from the occupant, because typically, the gas used to inflate air-bags in motor vehicles is generated at high temperature which can cause serious burns if it is directed towards an occupant during a crash situation.

JP01277991-A discloses a prior arrangement to direct the venting flow of gas from the interior of an air-bag, such that the gas flows in directions substantially tangential to the outermost surface of the air-bag rather than generally orthogonal to the outermost surface of the air-bag. This is achieved by providing each vent hole with a cover flap which is configured to form a duct to direct the venting gas flow as desired. However, the provision of a separate fabric cover over the vent hole, in addition to the fabric of the air-bag, is considered to be disadvantageous, because it necessitates stitching together of the two pieces of fabric, thereby complicating the manufacturing process to produce the air-bag.

It is therefore an object of the present invention to provide an improved air-bag having a vent hole formed therein.

Accordingly, the present invention provides an air-bag having a vent hole formed therein, the periphery of the vent hole having first and second opposed parts, wherein a tuck is formed in the air-bag in the region of said first part such that said second part extends past said first part in a direction extending substantially outwards from the interior volume of the air-bag, when the air-bag is inflated.

Numerous embodiments and implementations of the invention may be implemented, including:
  a) The tuck defines a pleat in the air-bag;
  b) The tuck is tapered;
  c) The tuck is formed by a fold in the air-bag, the fold intersecting the first part of the vent hole periphery;
  d) The tuck is at least partly defined by a seam intersecting said first part of the vent hole;
  e) The tuck is formed by stitching together two regions of the air-bag;
  f) The tuck is formed so as to lie inside the interior volume of the air-bag;
  g) The tuck is folded and secured against the interior surface of the air-bag; and
  h) The tuck is secured against the interior of the air-bag by stitching.

Conveniently, the air-bag has a plurality of said vent holes, each vent hole having a respective said tuck provided in the region of its periphery.

So that the invention may be more readily understood, and so that further features thereof may be appreciated, embodiments of the present invention will now be described, by way of example, with reference to the accompanying drawings, in which:

DETAILED DESCRIPTION OF THE INVENTION

Figure 1:
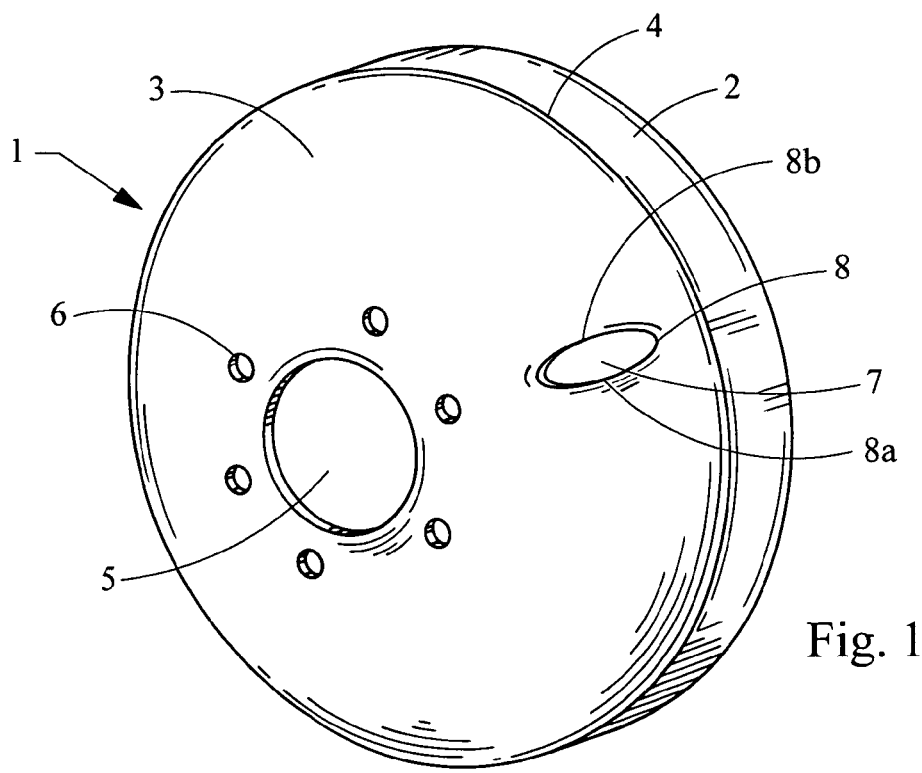
FIG. 1 is a perspective view of an air-bag having a vent-hole formed therein prior to manipulation to produce an air-bag in accordance with the present invention.
Figure 2A:
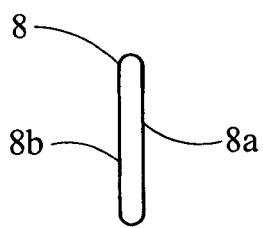
FIG. 2 illustrates different shapes of vent hole which can be used to form an air-bag in accordance with the present invention.
Figure 2B:
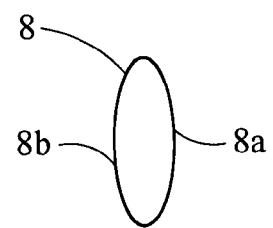
Figure 2C:
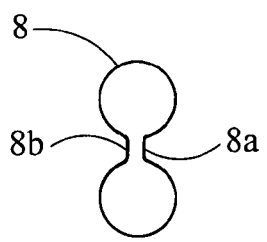
Figure 2D:
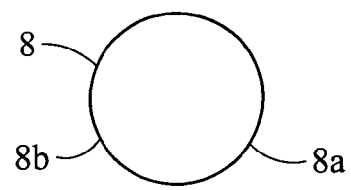

Having regard initially to FIG. 1, there is illustrated an air-bag 1 of generally circular configuration, particularly suitable for installation within the housing of a steering wheel to provide protection to the driver of a motor vehicle in the event of a frontal impact. Whilst the air-bag of the present invention is particularly suitable for use as a frontal impact air-bag, it should be appreciated that air-bags in accordance with the present invention can take any convenient configuration and can be used to provide protection in other types of accident situations.

The air-bag 1 illustrated in FIG. 1 comprises a front layer of flexible material 2 and a rear layer of flexible material 3. The front and rear layers 2 and 3 of flexible material preferably comprise fabric material. The front and rear layers of material 2, 3 are interconnected with one another around their respective peripheries to form an interconnecting seam 4. However, it should be appreciated that the front and rear layers of material 2, 3 could be formed integrally with one another, for example via a one-piece weaving technique, in which the warp and weft yarns of one layer of fabric are interconnected with the warp and weft yarns of the other layer of fabric as the two layers are woven simultaneously.

The rear layer of material 3 is provided with a generally centrally-located gas inlet aperture 5 and has a plurality of smaller mounting apertures 6 formed through the rear layer 3 around the periphery of the gas inlet aperture 5. The gas inlet aperture 5 is provided to receive part of an inflator such as, for example, a gas generator, and the mounting apertures 6 are provided to secure the rear layer 3 to the inflator around the periphery of the gas inlet aperture 5.

A vent hole 7 is also provided in the rear layer of air-bag material 3. The particular vent hole 7 illustrated in FIG. 1 has a substantially elliptical periphery having first and second opposed parts 8a, 8b.

FIG. 2 illustrates four different shapes of vent hole 7 which can be used in the air-bag of the present invention. It will be seen that the vent hole illustrated in FIG. 2b is largely identical in shape to the elliptical vent hole 7 illustrated in the air-bag 1 shown in FIG. 1. FIG. 2a illustrates a vent hole taking the form of an elongate slit which can be provided in the material of the air-bag. FIG. 2c illustrates an alternative form of vent hole which has a periphery of generally "peanut" or "figure of eight" shape. FIG. 2d illustrates a circular vent hole. It will be seen from FIG. 2, that each of the four different configurations of vent hole illustrated have a periphery 8 having a pair of opposed parts 8a, 8b.

Figure 3:
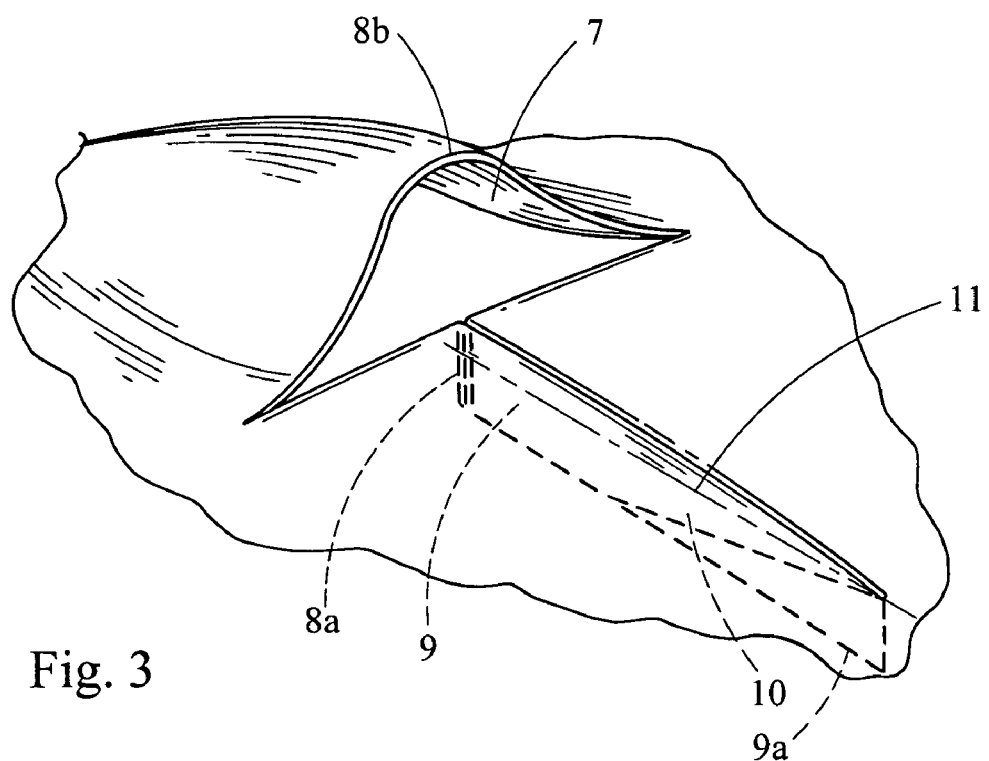
FIG. 3 is an enlarged perspective view of the vent hole of an air-bag, showing a tuck being provided in the material of the air-bag, adjacent to the vent hole.

FIG. 3 illustrates a stage during the manufacture of an air-bag in accordance with the present invention. The illustration shown in FIG. 3 is an enlarged perspective view of a vent hole 7 such as, for example, the elliptical vent hole illustrated in FIG. 1 and FIG. 2a, and the surrounding region of material defining the air-bag 1. It will be seen from FIG. 3 that the material of the air-bag in the region immediately adjacent the first part 8a of the periphery 8 of the vent hole 7 has been manipulated so as to define a tapered tuck 9 in the material. The first part 8a of the vent hole periphery 8 has been folded into a substantially "T"-shaped configuration to define the tuck 9 which takes the form of a generally triangular-shaped tapering dart formed in the fabric of the air-bag, having a fold 10 formed in the material of the air-bag.

The tuck 9 is directed inwardly of the air-bag so as to lie inside the interior volume of the air-bag. At the surface of the air-bag, regions of the air-bag material are secured together by a seam 11 which can be formed, for example, by stitching, and which intersects the periphery of the vent hole 7.

It will be seen that because a tuck has been provided in the air-bag material in the region of the first part 8a of the vent hole periphery 8, the effect is to shorten the first peripheral part 8a of the vent hole 7 relative to the opposed peripheral part 8b of the vent hole 7. The effect of this is that the material of the air-bag in the region of the opposed part 8b of the vent hole 7 becomes configured so as to project or extend past the first part 8a of the periphery in a direction extending substantially outward from the interior volume of the air-bag, so as to define a small duct to direct a venting outflow of gas from the interior of the air-bag to the exterior of the air-bag in a direction generally aligned with the tuck 9 formed in the material.

Figure 4:
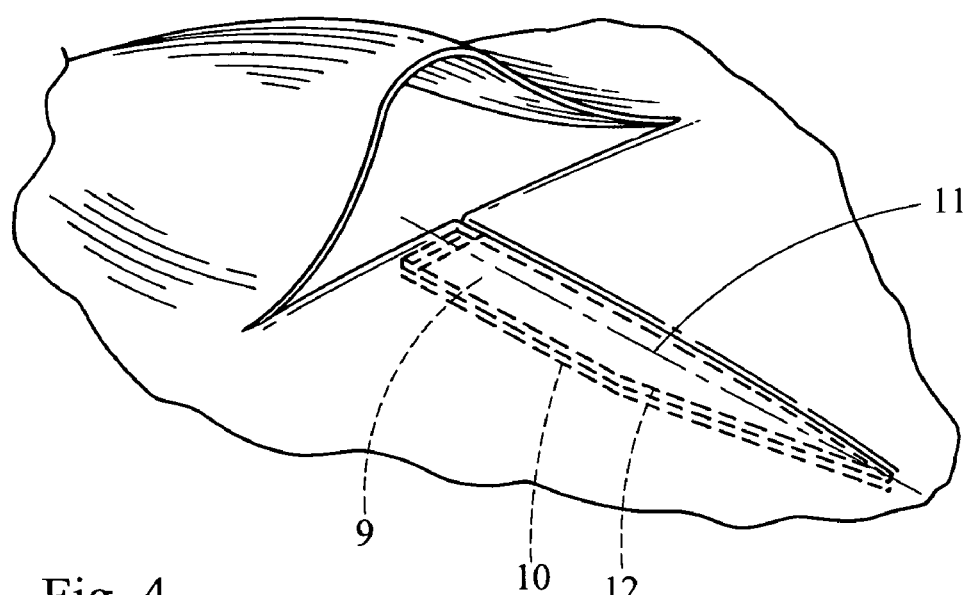
FIG. 4 corresponds generally to FIG. 3, but illustrates the tuck of material being folded to assume an alternate position.

FIG. 4 illustrates the tuck 9 having been folded in the region of the seam 11 so as to lie adjacent the interior surface of the air-bag. The tuck 9 can be secured in this position against the interior surface of the air-bag by, for example, by way of a further line of stitching 12 formed in the region of the fold 10.

Figure 5:
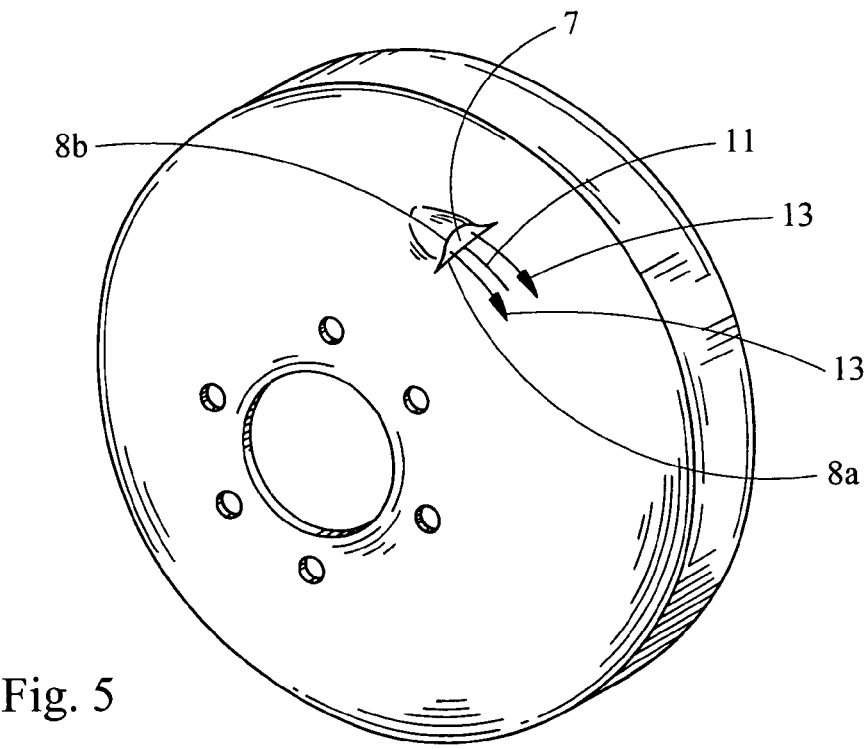
FIG. 5 is a perspective view of an air-bag having a vent-hole configured in accordance with the present invention.

Turning now to consider FIG. 5, there is illustrated a completed air-bag generally in accordance with the present invention, having a vent hole configured as illustrated in FIGS. 3 and 4. The vent hole 7 is oriented such that the seam 11 lies substantially perpendicular to a notional radial axis of the circular air-bag 1. It will therefore be seen that with this orientation of the vent holes 7, when the air-bag 1 is inflated, the part 8b of the vent hole periphery extends outwardly past the first part 8a of the vent hole periphery so as to define an outwardly-projecting duct which, it will be appreciated, is configured to direct a venting outflow of gas across the rear surface of the air-bag in a direction substantially parallel to the seam 11, as illustrated by arrows 13.

Figure 6:
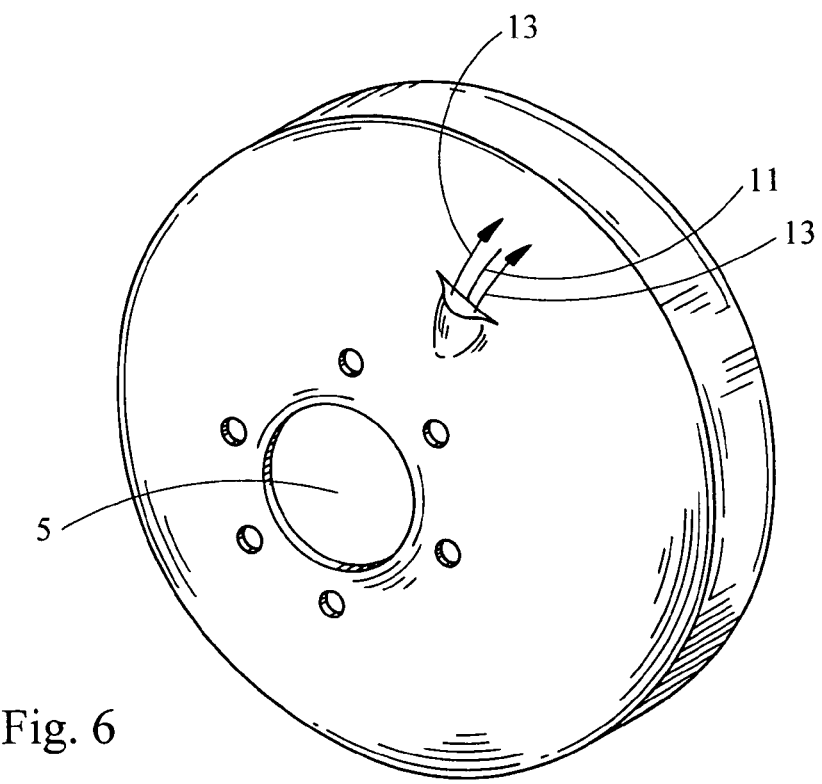
FIG. 6 is a perspective view corresponding generally to that of FIG. 5, but illustrating an alternative orientation of the vent hole, in accordance with another embodiment of the present invention.

FIG. 6 illustrates an alternative orientation of the vent holes 7, in which the seam 11, and hence also the tuck 9 (not shown in FIG. 6) is directed generally radially outwardly from the gas inlet aperture 5 of the air-bag 1. This results in a venting outflow of gas upon inflation of the air-bag which is directed radially outwardly from the interior volume of the air-bag 1.

It should therefore be appreciated that the vent holes 7 of an air-bag in accordance with the present invention can be oriented relative to the air-bag to provide a predetermined venting outflow direction, and hence can be orientated specifically to direct the venting outflow of gas away from certain parts of the vehicle structure or away from an occupant of the motor vehicle, to prevent injury to the occupant in the event of an accident.

It should be appreciated that whilst the present invention has been described above as having a tapered tuck 9 in the form of a tapering dart (see FIG. 3), the tapered tuck 9 could alternatively take the form of a non-tapering pleat 9a in the material 3 of the air-bag. In this case, the non-tapering pleat 9a may extend from the periphery 8 of the vent hole 7 to the edge or periphery of the material 3 defining the air-bag.

The features disclosed in the foregoing description, or the following claims, or the accompanying drawings, expressed in their specific forms or in terms of a means for performing the disclosed function, or a method or process for attaining the disclosed result, as appropriate, may, separately, or in any combination of such features, be utilised for realising the invention in diverse forms thereof.

I claim:

1. An air-bag made of a flexible material having a vent hole formed therein, comprising a periphery of the vent hole having a first and a second opposed parts, wherein a tuck is formed in the material of the air-bag in the region of the first part as a result of the first part being shorter than the second part such that the second part extends past the first part in a direction extending substantially outward from the interior volume of the air-bag, when the air-bag is inflated.

2. An air-bag according to claim 1, wherein the tuck defines a pleat in the air-bag.

3. An air-bag according to claim 1, wherein the tuck is tapered.

4. An air-bag according to claim 1, wherein the tuck is formed by a fold in the air-bag, the fold intersecting the first part of the vent hole.

5. An air-bag according to claim 1, wherein the tuck is at least partly defined by a seam intersecting the first part of the vent hole.

6. An air-bag according to claim 1, wherein the tuck is formed by stitching together two regions of the air-bag.

7. An air-bag according to claim 1, wherein the tuck is formed so as to lie inside the interior volume of the air-bag.

8. An air-bag according to claim 7, wherein the tuck is folded and secured against the interior surface of the air-bag.

9. An air-bag according to claim 8, wherein the tuck is secured against the interior surface of the air-bag by stitching.

10. An air-bag according to claim 1, having a plurality of vent holes, at least one of the vent holes having the tuck provided in the region of its periphery.

* * * * *